United States Patent [19]

Cole, Jr.

[11] 4,453,923

[45] Jun. 12, 1984

[54] VARIABLE DIAMETER PULLEY ASSEMBLY

[75] Inventor: Edward H. Cole, Jr., Ithaca, N.Y.

[73] Assignee: Borg-Warner Corporation, Chicago, Ill.

[21] Appl. No.: 230,981

[22] Filed: Feb. 2, 1981

[51] Int. Cl.³ .................... F16H 55/36; F16H 9/10
[52] U.S. Cl. ........................ 474/47; 474/49; 474/54
[58] Field of Search ............ 474/49, 50, 54, 55, 474/47, 48

[56] References Cited

U.S. PATENT DOCUMENTS

| | | |
|---|---|---|
| 1,110,804 | 9/1914 | Little. |
| 1,421,908 | 7/1922 | Cattoi ................................. 474/54 |
| 1,882,584 | 9/1931 | Conners ............................. 474/54 |
| 2,213,778 | 9/1940 | Yamanaka ......................... 474/54 |
| 4,024,772 | 5/1977 | Kumm ................................ 474/54 |

Primary Examiner—John E. Murtagh
Assistant Examiner—Andrew Joseph Rudy
Attorney, Agent, or Firm—Aubrey L. Burgess

[57] ABSTRACT

A variable diameter pulley assembly for use with a power transmission belt and adapted to be connected to a shaft comprising opposed sets of axial and radial movable generally triangular or trapezoidal-shaped flange members, the sides of opposed sets being in substantial engagement to provide at all pulley diameters a generally cylindrical and continuous surface for belt engagement. A pair of axially movable hubs supports the flange members, and each hub has guides for guiding the flange members in their axial and radial movements. A central cam member with conical cam surfaces may be provided which cooperates with cam follower surfaces of the flange members whereby axial movement of the flange members causes radial movement thereof.

2 Claims, 16 Drawing Figures

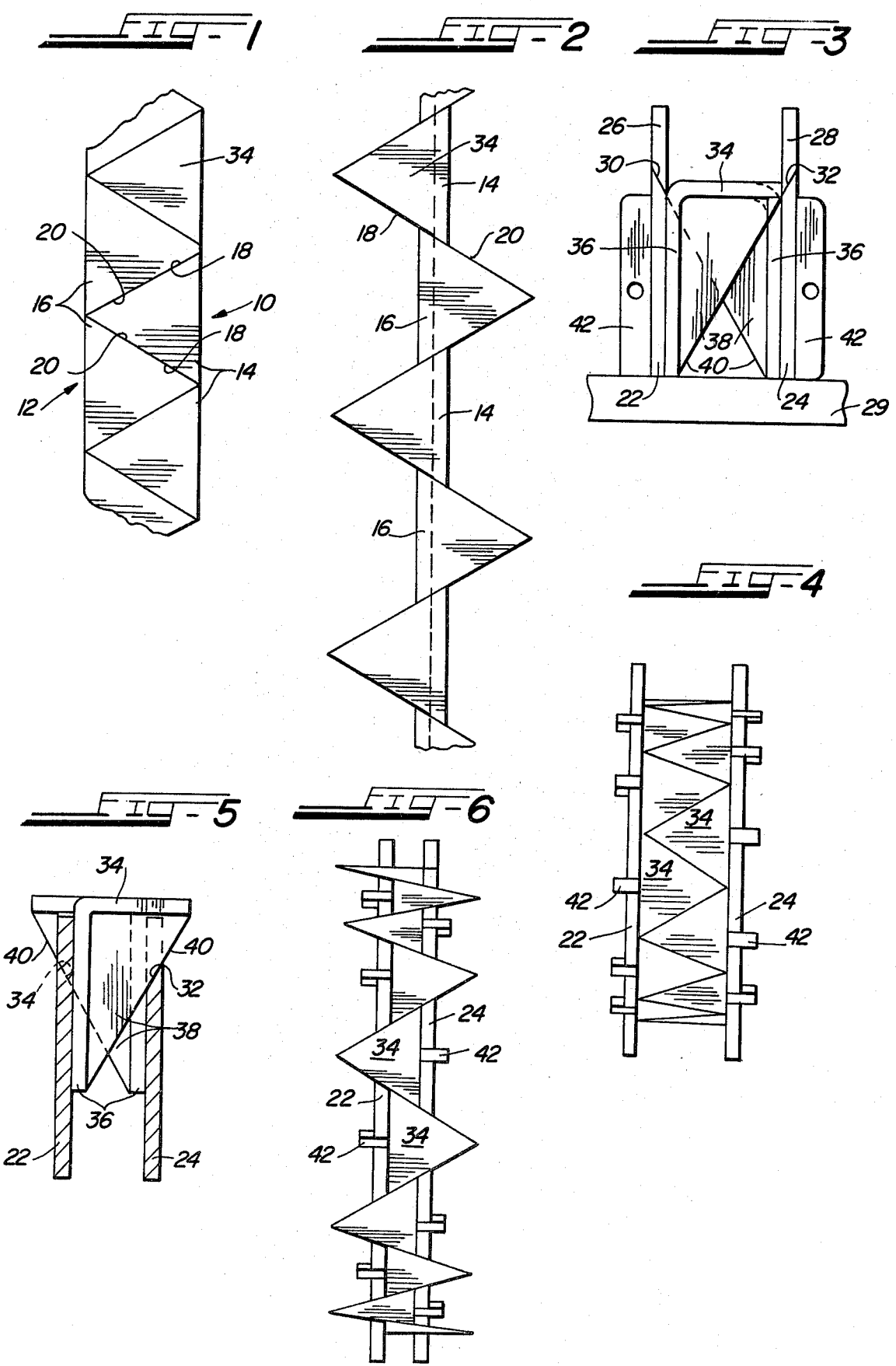

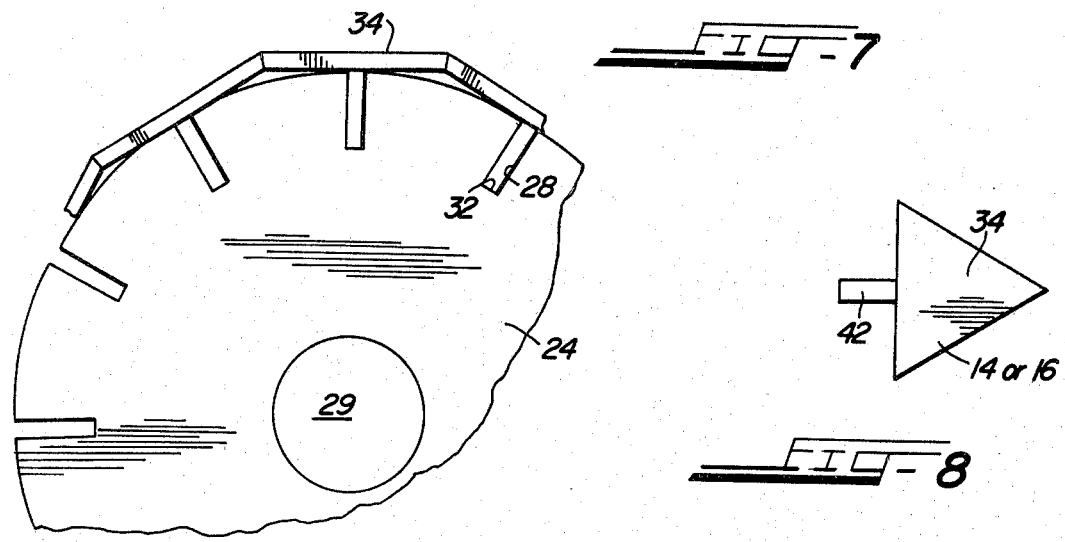
FIG-7
FIG-8
FIG-9  FIG-10
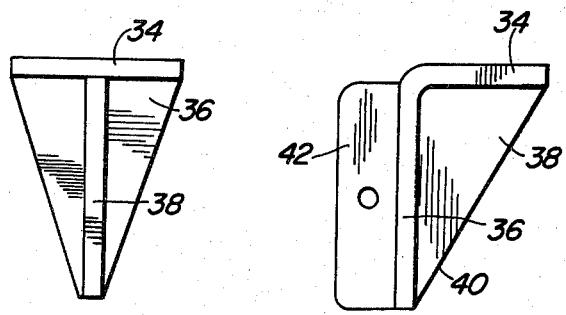
FIG-11  FIG-12  FIG-13
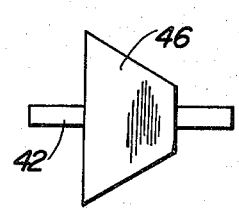
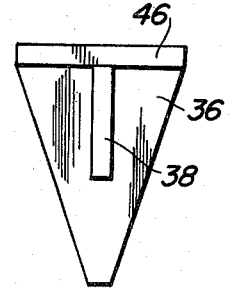
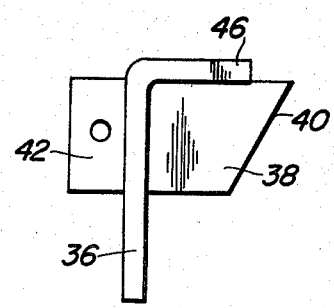

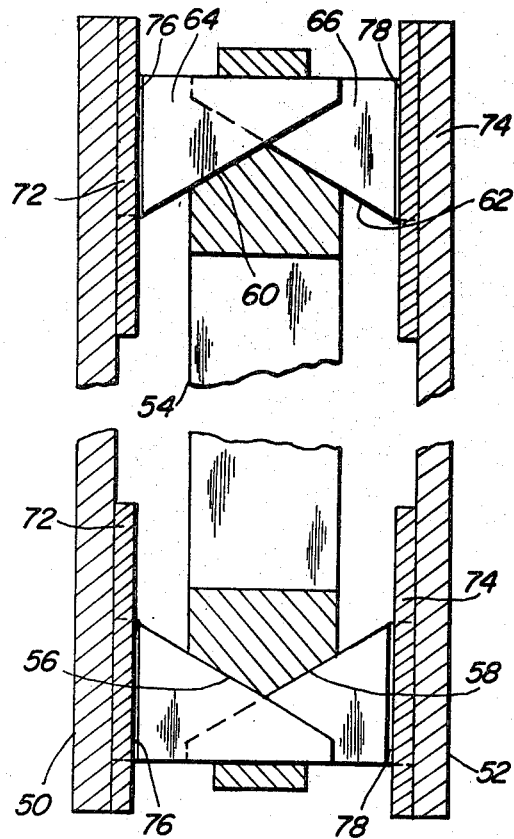
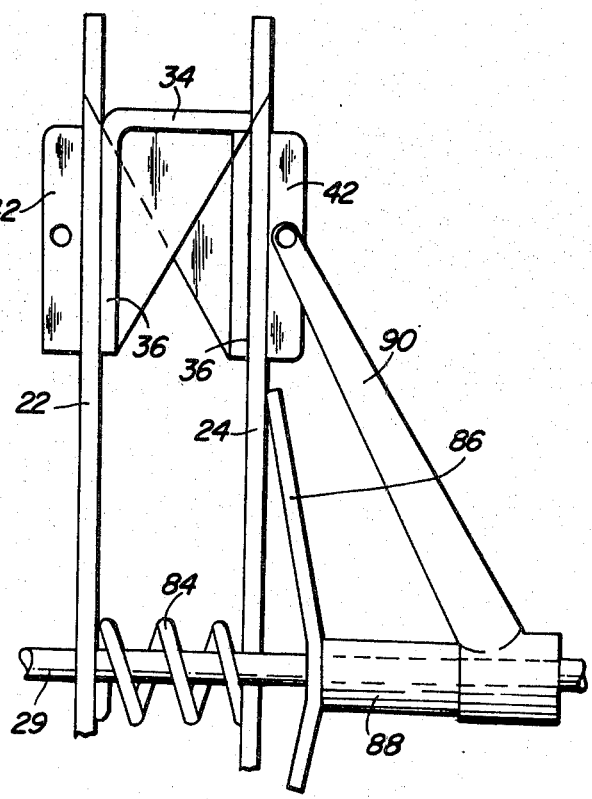
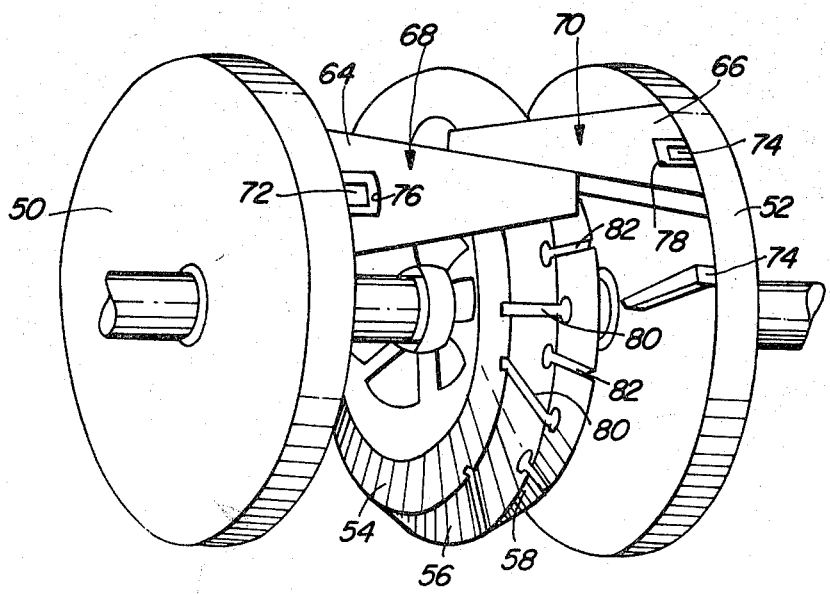

4,453,923

VARIABLE DIAMETER PULLEY ASSEMBLY

BACKGROUND OF THE INVENTION

Variable diameter belt drive pulleys are known in the art; however because of the non-continuous surfaces, the gaps become larger as the diameter increases, resulting in relatively short wear-life of power transmission belts drivingly connecting the pulleys.

SUMMARY OF THE INVENTION

According to this invention, there is disclosed a variable diameter pully which has a substantially continuous outer cylindrical surface for belt engagement at all pulley diameters. This is accomplished by having a pair of spaced axially movable hubs rotatably supported on a shaft, each hub supporting for axial and radial movement a set of flange or wedge members. Each flange or wedge member is generally triangular or trapezoidal in shape with its edges in engagement with an opposing flange or edge member, thus providing a substantially continuous cylindrical surface for the belt contact. Means, such as hydraulic means, may be provided for varying the spacing between the hubs, thus changing the effective diameter of the pulley. A central cam member having conical cam surfaces may be provided to cooperate with cam follower surfaces on the flange members, whereby axial movement of the flange members also causes radial movement thereof.

SUMMARY OF THE DRAWINGS

FIG. 1 is a plan view in expanded form of a portion of a maximum width belt engaging pulley surface according to this invention.

FIG. 2 is a plan view similar to FIG. 1 of a portion of a minimum width belt engaging pulley surface;

FIG. 3 is a sectional view of a variable diameter pulley constructed according to this invention, illustrating the flange members at one position providing maximum belt engaging surface width and minimum pulley diameter;

FIG. 4 is an elevational illustration of the pulley as in FIG. 3;

FIG. 5 is a sectional view, similar to FIG. 3, with the pulley at maximum diameter and the continuous belt engaging surface at its minimum width;

FIG. 6 is an elevational view, similar to FIG. 2, but of the pulley illustrated in FIG. 5;

FIG. 7 is a side view of the pulley of FIGS. 3 and 5 showing one of the pulley hubs;

FIG. 8 is a plan view of one form of flange member;

FIG. 9 is an elevational view of the flange member of FIG. 8;

FIG. 10 is a side view of the flange member of FIG. 8;

FIGS. 11, 12 and 13 are views similar to FIGS. 8, 9 and 10 of another form of flange member;

FIG. 14 is a sectional view of another form of variable diameter pulley;

FIG. 15 is a perspective view of the pulley of FIG. 14; and

FIG. 16 is an illustration of one form of a control system for the various pulley embodiments.

DETAILED DESCRIPTION OF THE INVENTION

Attention is invited to FIGS. 1 and 2 of the drawings wherein there is illustrated in a partial planar expanded view, the minimum and maximum diameter pulley conditions which correspond, respectively to the maximum and minimum belt engaging continuous pulley surfaces. In FIG. 1 there is illustrated opposing sets 10 and 12 each comprising a plurality of flange members 14 and 16, respectively, each flange member being alike with each opposing set being out of phase with the other, so that the sides 18 of a flange member 14 engages the sides 20 of a flange member 16 to define the wide belt engaging surface. The same is true for the pulley condition in FIG. 2; but the sides 18 and 20 contact one another to define a continuous, narrow belt engaging surface.

FIGS. 3 and 4 correspond generally to the pulley condition illustrated in FIG. 1 and illustrate a pair of hubs 22, 24, each having a plurality of slots 26, 28 terminating in an angled cam surface 30, 32 respectively. The hubs 22 and 24 are supported on a shaft 29. Each flange member 14 and 16 (see FIGS. 8 to 10) is constructed of a first generally triangular part 34, a second generally triangular part 36 and a generally triangular web part 38. The part 34 provides the belt engaging surface; the web part 38 is received in a slot 26 or 28, the defining surface 40 thereof functioning as a follower surface engaging a cam surface 30 or 32. The part 36 engages the inside surface of a hub 22 or 24; guide means 42 (see FIGS. 3 and 13) may be provided which pass through slots 28 (see FIG. 7) in hubs 22 and 24. When the hubs 22 and 24 are axially moved toward each other, the flange members 14 and 16 move axially and radially to their FIG. 2 positions and define the continuous, narrow belt engaging surface. The narrow, continuous belt engaging surface position of the hubs is also illustrated in FIGS. 5 and 6.

Another embodiment of the flange means 14 or 16 is illustrated in FIGS. 11 to 13 in which the part 46 is in the shape of a trapezoid. The remaining parts are similar to like parts in FIGS. 8 to 10 and are identified with like reference characters.

FIGS. 14 and 15 illustrate a second embodiment of a variable diameter pulley according to this invention which comprises, in addition to axially movable hubs 50 and 52, a central cam member 54 having conical cam surfaces 56 and 58 for engagement with follower surfaces 60 and 62 of the flange members 64 and 66 of flange member sets 68 and 70. The flange members are vertically guided by guides 72 and 74 fitting into the guide channels 76 and 78 of the members 64 and 66, respectively. The cam surfaces 56 and 58 may be augmented by cam slots 80 and 82 in which portions of the flange members are received, if desired. As readily understood, axial movement of the hubs causes axial and radial movement of the flange members 64 and 66 while providing a substantially continuous belt engaging surface of the pulley.

One form of a control system for varying the effective diameter of a pulley constructed according to this invention is illustrated in FIG. 16 to which attention is invited. The parts common to the arrangement illustrated in FIGS. 1 to 7 are identified by the same reference characters. In addition, a coil spring 84 surrounds the shaft 29 and is located between the hubs 22 and 24 and an annular belleville spring 86 is located around the shaft 29 with its outer edge in contact with the lower edges of the guides 42 and its center attached to a cylindrical hub 88 also surrounding the shaft 29. A plurality of rigid arms or links 90 are each pivotably connected at one end to the hub 88 and are each pivotably connected at their other end to a guide 42. As can well be understood, axial movement of the hub 80 causes axial movement of the hub 24, changing the spacing between the hubs 22 and 24 and changing the diameter of the pulley 10. The springs 84 and 86 maintain the rigidity of the pulley at any diameter.

It is to be understood that other control arrangements can be used. Also, in the structure described mechanical, hydraulic or pneumatic devices may be used to move the hub 88.

I claim:

1. A variable diameter pulley assembly for use with a power transmission belt and adapted to be connected to a rotatable shaft, comprising:

a pair of hubs connected for rotation with said shaft, at least one hub being axially movable with respect to said shaft;

opposed sets of cooperating flange members, each set being associated with one of said hubs and having generally triangular abutting axially oriented outer surfaces to thus provide at all pulley diameters a substantially continuous and generally cylindrical outer surface adapted to be frictionally engaged by the power transmission belt;

means mounting said flange member of each set so that they are axially and radially movable with respect to each other, said mounting means comprising radially extending elongated guide means associated with said hubs;

means to move said one hub axially relative to said shaft;

slot means in each hub engaging the opposite flange member to guide and cause radial movement thereof when said hub is axially moved relative to said shaft;

whereby axial and radial movement of said flange members varies the outer diameter of said pulley assembly.

2. A variable diameter pulley assembly for use with a power transmission belt and adapted to be connected to a rotatable shaft, comprising:

a pair of hubs connected for rotation with said shaft, at least one hub being axially movable with respect to said shaft;

opposed sets of cooperating flange members, each set being associated with one of said hubs and having generally triangular abutting axially oriented outer surfaces to thus provide at all pulley diameters a substantially continuous and generally cylindrical outer surface adapted to be frictionally engaged by the power transmission belt;

means mounting said flange member of each set so that they are axially and radially movable with respect to each other, said mounting means comprising radially extending elongated guide means associated with said hubs;

a cam member positioned between said hubs;

means to move said one hub axially relative to said shaft;

slot means formed in said cam member engaging each flange member to guide and cause radial movement thereof when said hub is axially moved relative to said shaft;

whereby axial and radial movement of said flange members varies the outer diameter of said pulley assembly.

* * * * *